(12) United States Patent
Meredith et al.

(10) Patent No.: US 10,296,612 B2
(45) Date of Patent: May 21, 2019

(54) SORTING SYSTEM

(71) Applicants: AT&T Mobility II LLC, Atlanta, GA (US); AT&T Intellectual Property I, L.P., Atlanta, GA (US)

(72) Inventors: Sheldon K. Meredith, Roswell, GA (US); William C. Cottrill, Canton, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 620 days.

(21) Appl. No.: 14/869,374

(22) Filed: Sep. 29, 2015

(65) Prior Publication Data

US 2017/0091237 A1    Mar. 30, 2017

(51) Int. Cl.
*G06F 17/30* (2006.01)
*G06F 13/42* (2006.01)

(52) U.S. Cl.
CPC .... *G06F 17/30321* (2013.01); *G06F 13/4221* (2013.01); *G06F 17/30477* (2013.01)

(58) Field of Classification Search
None
See application file for complete search history.

(56) References Cited

U.S. PATENT DOCUMENTS

| | | | |
|---|---|---|---|
| 3,931,612 A | 1/1976 | Stevens et al. | |
| 4,030,077 A | 6/1977 | Florence et al. | |
| 4,132,314 A | 1/1979 | von Beckmann et al. | |
| 4,261,034 A | 4/1981 | Saccomano | |
| 4,298,957 A | 11/1981 | Duvall et al. | |
| 4,464,732 A | 8/1984 | Clark | |
| 4,750,149 A | 6/1988 | Miller | |
| 4,907,186 A | 3/1990 | Racey | |
| 4,939,639 A | 7/1990 | Lee et al. | |
| 5,179,699 A | 1/1993 | Iyer et al. | |
| 5,218,700 A | 6/1993 | Beechick | |
| 5,600,825 A | 2/1997 | Atkins et al. | |
| 5,905,387 A | 5/1999 | Chinosi et al. | |
| 5,917,828 A | 6/1999 | Thompson | |

(Continued)

OTHER PUBLICATIONS

Non-final Office action dated Jan. 8, 2018 in U.S. Appl. No. 14/957,035, filed Dec. 2, 2015, 20 pages.

(Continued)

*Primary Examiner* — Eric Coleman
(74) *Attorney, Agent, or Firm* — Zagorin Cave LLP (57) ABSTRACT

A sorter sorts a list of elements using a plurality of registers. Each register stores a value of at most one element. Each register receives an input from a previous one of the registers indicating whether the previous one of the registers is storing a value of a list element before storing a value of a list element. Each register supplies an indication to a next register whether the register is storing a list element value. A register sends a stored value and the register identification to a register stack. The register stack uses the value as an index to store a pointer to the register. In that way a sorted list is created in the register stack. A register stores list location information for one or more occurrences of a value stored by the register. Overflow of list location information is handled in a duplicate values stack.

20 Claims, 6 Drawing Sheets

(56) References Cited

U.S. PATENT DOCUMENTS

| | | | |
|---|---|---|---|
| 6,073,128 A * | 6/2000 | Pongracz | G06F 11/1469 |
| | | | 707/640 |
| 6,188,251 B1 | 2/2001 | Priemer et al. | |
| 6,198,311 B1 | 3/2001 | Shi et al. | |
| 6,199,084 B1 * | 3/2001 | Wiseman | G06T 5/20 |
| | | | 382/262 |
| 6,289,509 B1 | 9/2001 | Kryloff | |
| 6,310,740 B1 | 10/2001 | Dunbar | |
| 6,366,911 B1 | 4/2002 | Christy | |
| 6,741,999 B2 | 5/2004 | Wagner | |
| 6,757,766 B1 | 6/2004 | Hutner et al. | |
| 6,775,667 B1 * | 8/2004 | Lewis | G06F 7/36 |
| 7,092,901 B2 | 8/2006 | Davis et al. | |
| 7,177,319 B2 * | 2/2007 | Buchert | G06F 7/24 |
| | | | 370/437 |
| 7,197,498 B2 | 3/2007 | Perloff | |
| 7,233,895 B2 | 6/2007 | Petty | |
| 7,277,606 B1 | 10/2007 | Sakai | |
| 7,450,588 B2 | 11/2008 | Chang et al. | |
| 7,467,138 B2 | 12/2008 | Carroll | |
| 7,689,541 B1 | 3/2010 | Le Grand | |
| 7,711,603 B2 | 5/2010 | Vanker | |
| 7,796,583 B1 | 9/2010 | Enderby | |
| 7,870,159 B2 | 1/2011 | Carroll | |
| 7,975,120 B2 | 7/2011 | Sabbatini, Jr. et al. | |
| 8,014,270 B2 | 9/2011 | Halford et al. | |
| 8,094,157 B1 | 1/2012 | Le Grand | |
| 8,098,718 B2 | 1/2012 | Sienko et al. | |
| 8,239,231 B2 | 8/2012 | Lian | |
| 8,407,098 B2 | 3/2013 | Davydov | |
| 8,700,614 B1 | 4/2014 | Diller et al. | |
| 8,704,842 B1 | 4/2014 | Gaddy et al. | |
| 8,832,115 B2 | 9/2014 | Smintina et al. | |
| 8,964,771 B2 | 2/2015 | Tabatabaee et al. | |
| 9,106,238 B1 | 8/2015 | Cronie et al. | |
| 2002/0040362 A1 * | 4/2002 | Lewis | G06F 7/24 |
| 2002/0165707 A1 * | 11/2002 | Call | G06F 17/2205 |
| | | | 704/2 |
| 2002/0174222 A1 | 11/2002 | Cox | |
| 2003/0061597 A1 | 3/2003 | Curtis et al. | |
| 2005/0193174 A1 | 9/2005 | Arimilli | |
| 2006/0123014 A1 | 6/2006 | Ng | |
| 2006/0176901 A1 | 8/2006 | Terai | |
| 2007/0174124 A1 | 7/2007 | Zagofsky et al. | |
| 2007/0279274 A1 | 12/2007 | Hsieh | |
| 2008/0048641 A1 | 2/2008 | Makino | |
| 2008/0208951 A1 | 8/2008 | Gotz et al. | |
| 2008/0211544 A1 | 9/2008 | Makino | |
| 2008/0215584 A1 | 9/2008 | Furusho | |
| 2009/0103501 A1 | 4/2009 | Farrag | |
| 2009/0163223 A1 | 6/2009 | Casey | |
| 2009/0302232 A1 | 12/2009 | Groshoiz | |
| 2010/0031003 A1 | 2/2010 | Chen et al. | |
| 2010/0312995 A1 | 9/2010 | Sung | |
| 2011/0093546 A1 | 4/2011 | Rubingh | |
| 2013/0314101 A1 | 11/2013 | Belet | |
| 2013/0346425 A1 | 12/2013 | Bruestle | |
| 2014/0006665 A1 * | 1/2014 | Amano | G06F 13/362 |
| | | | 710/116 |
| 2014/0164652 A1 | 6/2014 | Pettijohn | |
| 2014/0266487 A1 | 9/2014 | Vaishnav | |
| 2014/0269684 A1 * | 9/2014 | Fortune | H04L 49/25 |
| | | | 370/355 |
| 2014/0281390 A1 | 9/2014 | Boland et al. | |
| 2015/0134795 A1 | 5/2015 | Theimer et al. | |
| 2015/0169585 A1 | 6/2015 | Korst et al. | |
| 2017/0325065 A1 | 11/2017 | Azam et al. | |

OTHER PUBLICATIONS

Non-final Office action dated Dec. 7, 2017 in U.S. Appl. No. 14/957,049, filed Dec. 2, 2015, 23 pages.

U.S. Appl. No. 14/957,049, filed Dec. 2, 2015, entitled "Sorting Apparatus," naming Sheldon K. Meredith, William C. Cottrill, and Jeremy Fix as inventors.

U.S. Appl. No. 14/924,005, filed Oct. 27, 2015, entitled "Analog Sorter," naming Sheldon K. Meredith and William C. Cottrill as inventors.

U.S. Appl. No. 14/957,035, filed Dec. 2, 2015, entitled "Adaptive Alphanumeric Sorting Apparatus," naming Sheldon K. Meredith, William C. Cottrill, and Rick K. Tipton as inventors.

Choi, Sung-Soon and Moon, Byung-Ro, "Isomorphism, Normalization, and a Genetic Algorithm for Sorting Network Optimization," Proceedings of the Genetic and Evolutionary Computation, Gecco, 2002, pp. 327-334.

Dewdney, A.K., "Computer Recreations—On the Spaghetti Computer and Other Analog Gadgets for Problem Solving," Scientific American, pp. 19-26, Jun. 1984.

Rovetta, S. and Zunino, R., "Minimal-connectivity circuit for analogue sorting," IEE Proc.-Circuits Devices Syst., vol. 146, No. 3, Jun. 1999, pp. 108-110.

Xing, Huanlai and Qu, Rong, "A Nondominated Sorting Genetic Algorithm for Bi-Objective Network Coding Based multicast Routing Problems," Information Sciences, 233 (2013), pp. 23 pages.

Non-Final Office action dated Sep. 17, 2018, for U.S. Appl. No. 14/957,035, 21 pages.

\* cited by examiner

SORTING SYSTEM

BACKGROUND

Field of the Invention

This application relates to sorting.

Description of the Related Art

The widely accepted value for the minimum number of comparison operations to sort a large list of N items is N log 2(N). Different algorithms don't improve on the N log 2(N) barrier, but provide opportunities to perform sorting of the list and also provide other measures during the process such as median and mean. Regardless, to sort a very large list of one billion items, for example, still requires roughly 30B comparisons. Each of these comparisons can also require many clock cycles of the computing system. 30B comparisons might actually take 300B clocked operations. In Big Data analytics, weather prediction, nuclear calculations, astrophysics, genetics, public health, and many other disciplines, there is a frequent need to sort very large datasets. This further implies computational resources than can literally fill buildings with racks of servers to service these needs. To the extent one can improve on this N log 2(N) limitation, or otherwise improve sorting operations, one can improve on the capital infrastructure and associated operational costs for computing systems.

SUMMARY OF EMBODIMENTS OF THE INVENTION

Accordingly, one embodiment for sorting a list of items includes a list communication bus coupled to supply the list of elements. A plurality of registers are coupled in parallel to the list communication bus. A register of the plurality of registers includes a value storage to store a value of one of the elements in the list. An input node receives an input value exist indication. The register supplies to an output node an output value exist indication to indicate, when asserted, that the register is storing a value of an element of the list in the value storage. Compare logic in the register asserts a match exist signal line coupled in parallel to the registers if a list value currently being supplied on the list communication bus matches the value in the value storage.

In another embodiment a method for sorting a list of elements includes supplying the list of elements from a list communication bus to a plurality of registers. Responsive to the register storing a value of an element of the list in a value storage and a list element being on the list communication bus, checking if a value of the list element matches the value in the value storage and asserting a match exist signal line coupled to the plurality of registers if the match exists. If the register is not storing a value of a list element in the value storage, the register is responsive to the list element being on the list communication bus to check a value exist input to the register indicating whether a preceding register has stored a list element. If the value exist input is not asserted then the register ignores the list element on the list communication bus. If the value exist input is asserted, then the register ignores the list element if the match exist line is asserted. If the value exist input is asserted and the match exist line is not asserted, the register stores a value of the list element in a value storage associated with the register.

In another embodiment, a sorting apparatus to sort a list of items includes a plurality of registers. At least one register includes a value storage to store a value of one of the items in the list. An input node of the register receives an input value exist indication from a previous one of the registers indicating whether the previous one of the registers is storing another value of another one of the elements of the list. The register supplies an output node an output value exist indication to a next register of the plurality of registers to indicate whether the one register is storing the value of the one of the items in the list in the value storage. The one register further includes a counter to count every element of the list. Count storage stores a count value of the counter that corresponds to a list location one of the items in the list whose value is stored in the value storage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
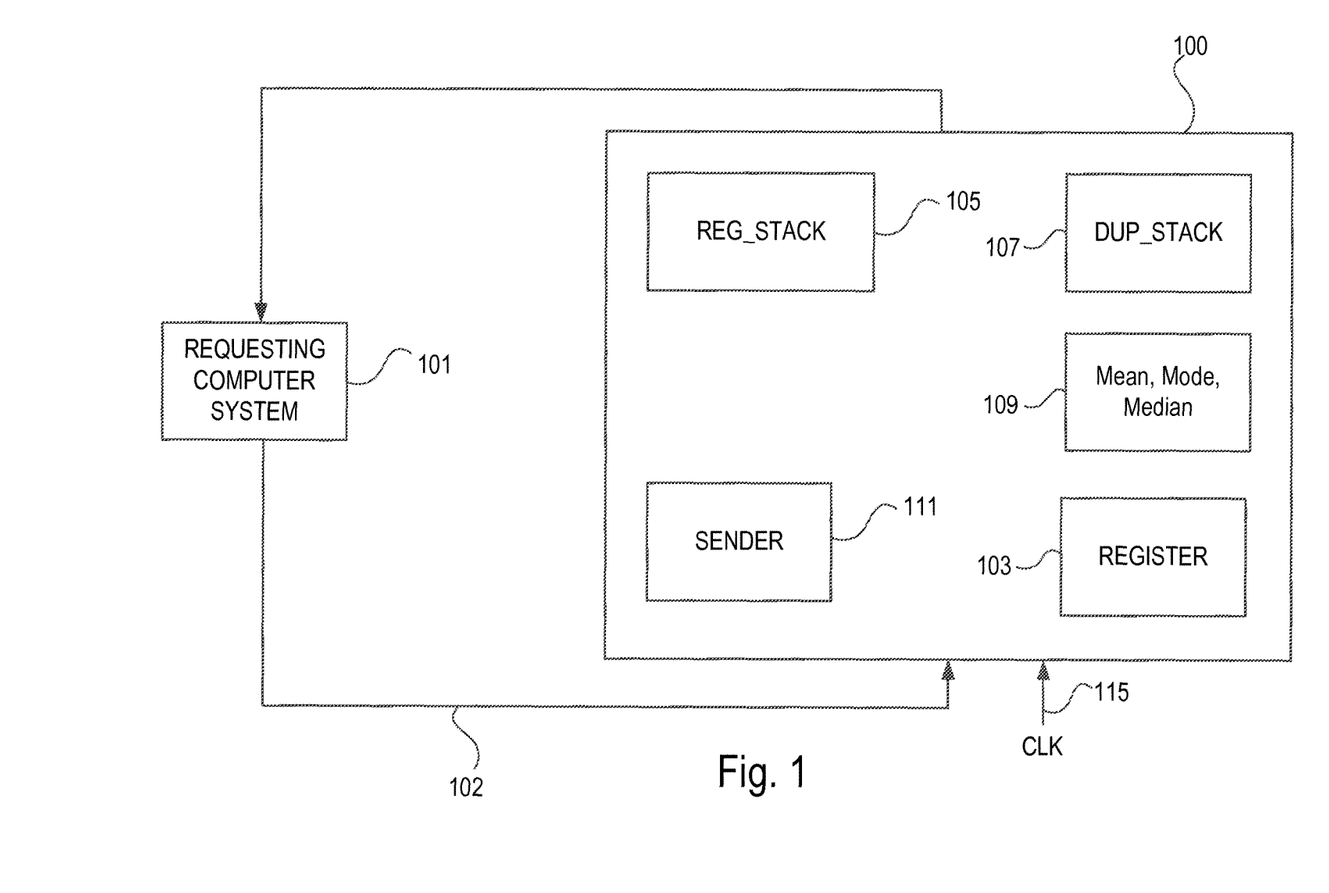
FIG. 1 illustrates a sorter system according to an embodiment.

Referring to FIG. 1 an electronic hardware sorter 100 receives a list of alphanumeric values (or any list than can be numerically represented) from a requesting computer system 101 and then sorts the list as described herein. The sorter 100 receives a serial list of alphanumeric values (the list) over a communication link 102. The list may be, e.g., numeric, text, ASCII, or user defined. In addition to the list, the sorter may receive such inputs as a reset command, a list type, and a count of the number of elements in the list. Primary sections of the sorter 100 include, registers 103, the register pointer stack (REG_STACK) 105, the duplicated values stack (DUP_STACK) 107, the median/mean/mode function (MMM) 109, and the sending function (SENDER) 111. The sorter 100 also receives a clock signal 115. Prior to the requesting computer system 101 sending the list to the sorter 100, a reset command may be provided that resets the entire sorter to a default or known state. The reset command can be sent on the same communication path as the list or on a separate one, and precedes the sending of the list. In other embodiments, the sorter 100 may reset itself after providing a sorted list to the requesting computer system or in response to a first list element or in any other suitable way.

The requesting computer system may send a total list size so that the sorter 100 knows when the last element of the list has been received. The received list may be terminated with a unique identifier or delimiter associated with the last element in the list. The sorting apparatus may count the number of elements in the list until the delimiter is received to determine the total list size. The sorter provides as outputs a sorted list of values and may also provide median, mean, and/or mode values associated with the sorted list.

Figure 2A:
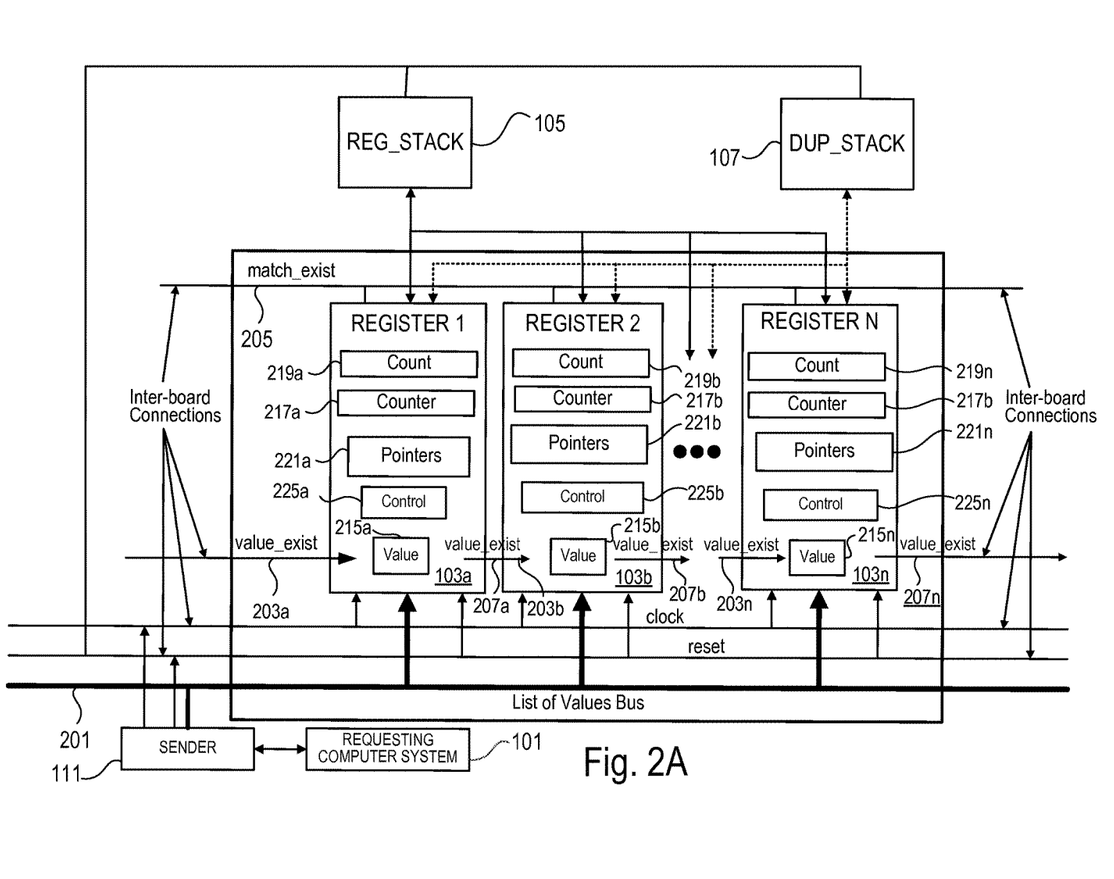
FIG. 2A illustrates additional details of an embodiment of a register of the sorter apparatus.

Referring to FIG. 2A, the registers 103 are shown in greater detail, along with interconnections between the register 103 and other functions of the sorter 100. Registers 103, which include registers 103a, 103b, and 103n, receive every incoming list element on the bus 201. Each of the registers 103a, 103b, 103n receives a value_exist input 203 (203a, 203b, 203n) and a match_exist input 205. Value_exist 203 tells a register whether the immediately preceding register is storing an element of the list. Match_exist is asserted if any register is already storing the same value as the value of the element appearing on bus 201.

A register does not evaluate a list element on bus 201 unless the value_exist input is asserted for that register or the register already is storing a list element value. For example, assume that for REGISTER N 103n, the value exist input 203n is not asserted. In that case, when a valid list element is present on bus 201, REGISTER N takes no action regarding that element. If on the other hand, the value exist input 203n is asserted for REGISTER N, but the value_exist output is not asserted, indicating the previous register is storing a value of an element of the list but not REGISTER N, REGISTER N evaluates the match_exist line. If the match_exist line is asserted, the register asserting the match_exist line handles the list element as described further herein and REGISTER N takes no action. If however, the match_exist line is not asserted, REGISTER N stores the value of the list item in the value storage 215n and then asserts the value_exist output signal line 207n.

If REGISTER N is already storing a list value in its value storage 215n, when a list element is present on bus 201, REGISTER N evaluates the list element on bus 201 to determine if the list element on bus 2013 matches the value in stored in value storage 215n. If the value of the list element on bus 203 matches the value stored, the REGISTER N asserts the match_exist line and all other registers take no action. If there is no match, REGISTER N takes no action. In an embodiment, the match_exist line utilizes an open collector implementation where any of the registers can assert to match exist line by pulling the line to ground. If none of the REGISTERs assert the match exist line 205, the line will remain at a high voltage typically by being pulled up to a supply voltage through a resistor.

In an embodiment, REGISTER 1 103a stores the first list element but note that REGISTER 1 has no preceding register to supply a value_exist signal. Therefore, for REGISTER 1, the input value_exist signal line 203a is kept asserted when REGISTER 1 evaluates the input value_exist signal line 203a for the first element of the list. In order to keep the input value_exists signal line 203a asserted, the value_exist line 203a for REGISTER 1 may be tied high (or low). Having the input value_exist signal line 203a asserted allows REGISTER 1 to evaluate whether or not the match_exist line 205 is asserted before storing a list element consistent with operation of other registers. Other embodiments may have the control logic in REGISTER 1 recognize it is the first register and ignore the value_exists signal line 203a. For the first element in the LIST, no other REGISTER has a list element value already stored, so match_exist 205 will remain unasserted for the first element. To make the control logic consistent across all regsiters, REGISTER 1 may evaluate the match-exist signal line 205 before storing the first element of the list. REGISTER 1 stores the value of the first list element on the bus 201 in value storage 215a.

Upon storing a list element value, each register asserts its own value_exist output signal which is supplied to the next physical register. For example, REGISTER 1 supplies value_exist output 207a to REGISTER 2 (received as 203b). Similarly, REGISTER 2 supplies value_exist signal line 207b to the next register.

After the first element of the list is consumed, the next incoming list element will be separated from the next value in LIST by a known delimiter such as a comma or a reserved character, or another protocol mechanism such as assertion and deassertion of control line, to indicate a transition between one element and a next list element. When the delimiter is recognized, or a valid list element is recognized on bus 201, that observation triggers a counter 217 (217a, 217b, 217n) to increment within every register. The count value of the counter identifies the location of an element in the list. Thus, the first element will have a count value of 1 and the second element will have a count value of 2. The count value identifies the location in the list of the stored value.

Assuming REGISTER 1 has processed the first element of the list then REGISTER 1 has stored the element value in value storage 215a. In addition, REGISTER 1 has a count value of 1 (that identifies the position in the list of the first list element) and stores that count value in the count storage 219a. REGISTER 1 then sends its stored list element value and its physical register ID=1 (since it is REGISTER 1) to the REG_STACK 105.

Figure 2B:
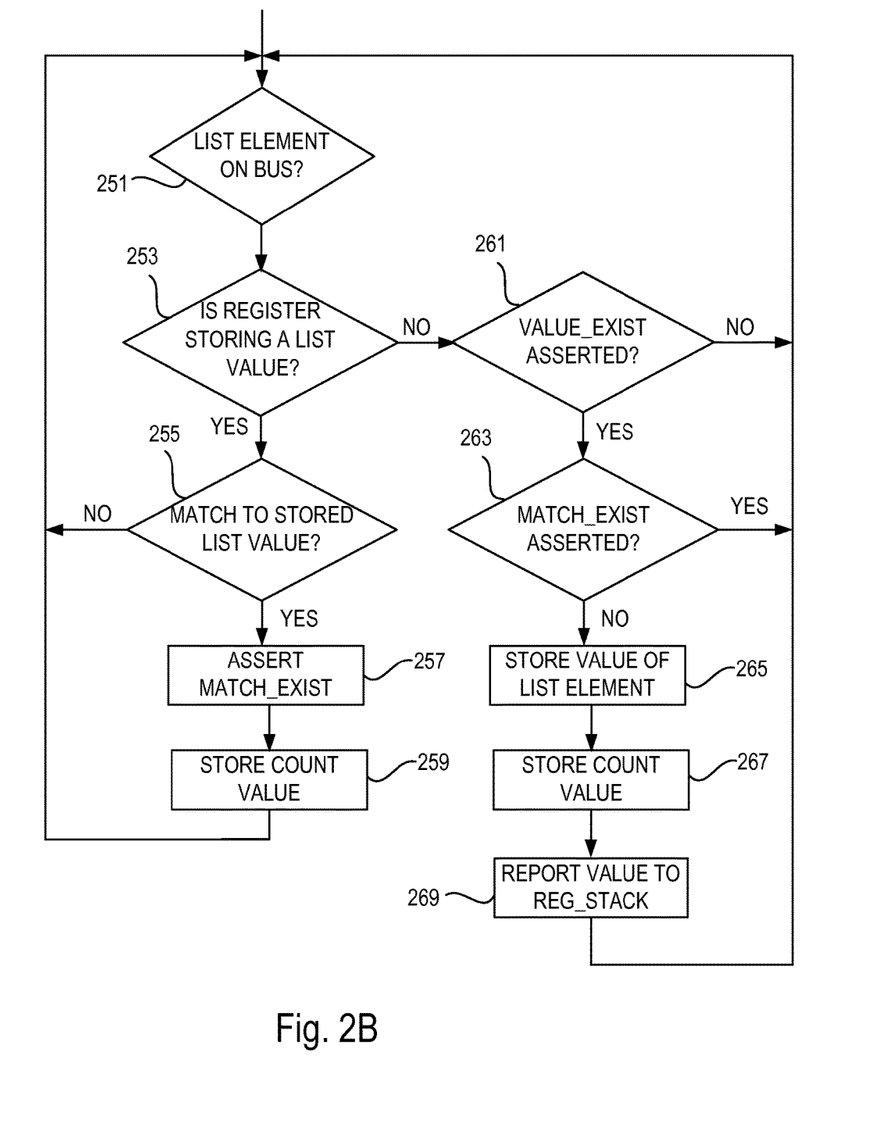
FIG. 2B illustrates a flow diagram showing an embodiment of the basic operation of a register evaluating a list element on bus 201

FIG. 2B illustrates a flow diagram showing an embodiment of the basic operation of a register evaluating a list element on bus 201. In 251, the control logic 225 checks if there is a list element on the bus based on a delimiter, valid line, or other protocol mechanism. If there is a list element to be evaluated, the control logic determines if the register is already storing a list element value in 253. If so, the control logic determines if a match exists between the stored list value and the value of the list element on the bus in 255. If the match exists, the control logic causes the match_exist line 205 to be asserted in 257, the count value stored in 259 so that the list position information is maintained for the list element, and then the control logic returns to 251 to wait for the next element of the list. If the register is not storing a list value yet, the control logic determines if the value_exist input signal line 203 is asserted in 261. If not, the flow returns to 251 to wait for the next element of the list. If the value_exist line is asserted, the control logic determines in 263 if the match_exist line is asserted, and if so, the flow returns to 251 to wait for the next list element. If no other register matches the value on the element on the bus in 263, the register stores the value of the list element in 265, stores the count value in 267, reports the value to the register stack in 269, and returns to 251 to wait for the next element on the bus.

Figure 3:
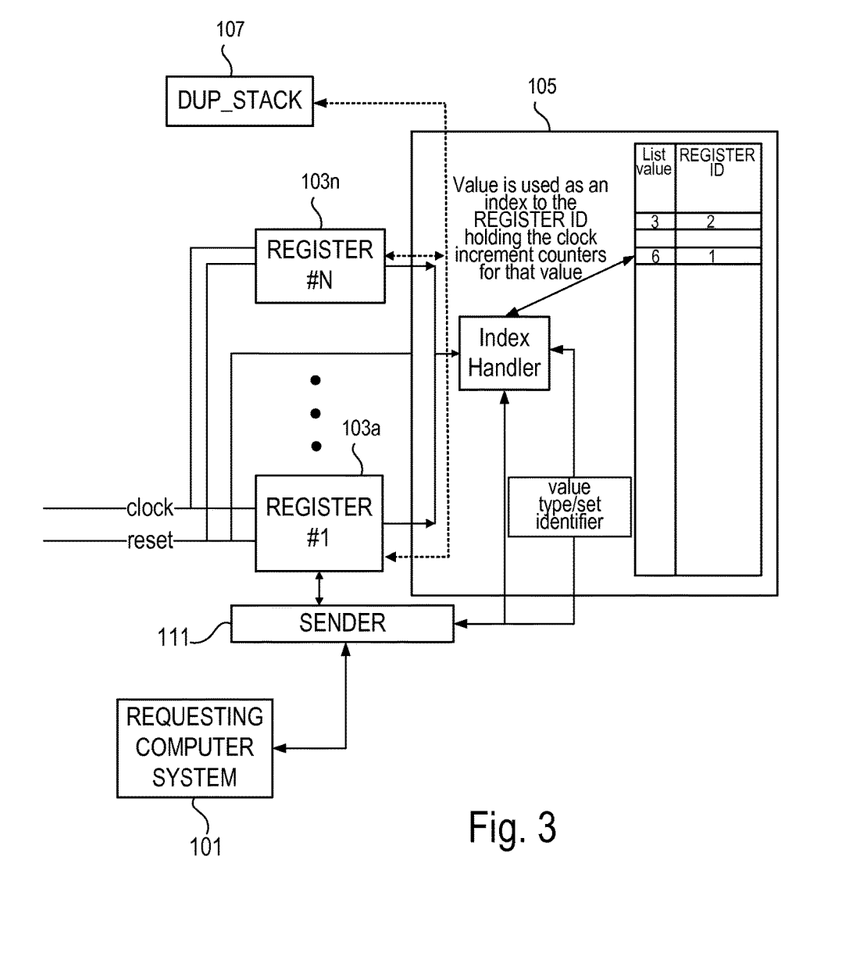
FIG. 3 illustrates additional details of an embodiment of the register stack (REG_STACK).

Referring to FIG. 3, additional details of an embodiment the register stack REG_STACK are illustrated. REG_STACK receives the stored value and the physical register ID and uses the stored value as an index into its stack 301. The index points to a location in the stack that stores the register ID as a pointer to the register that supplied the list element value. For example, assume the first element in the list has a value of 6. REGISTER 1 stores the value 6 and the count 1 as described above. REGISTER 1 sends its ID=1 and the value 6 to REG_STACK 105. REG_STACK uses the list value 6 as an index to store the register ID 1.

Now assume bus 201 provides a second list element and that list element has a different value that the first element. REGISTER 1 already has a stored value, so it ignores value_exist and match_exist and compares the incoming value to its stored value and finds no match, so it does not assert match_exist. REGISTER 2 now identifies that REGISTER 1 has a value through the value_exists line 203b (FIG. 2), but no other registers have a match, so REGISTER 2 stores the value of the second element in value storage 215b along with the count value from counter 217b in count storage 219b and send the list value and its register ID to REG_STACK.

For example, assume the value of the second element is 3. At this point in the process, REGISTER 1 holds value 6 with count value=1 and REGISTER 2 holds value 3 with count value=2. Further, REG_STACK has two entries, specifically at index 3, a pointer to REGISTER 2 and at index 6 a pointer to REGISTER 1. In this simplified example, it should be apparent that if one reads the REG_STACK the two values have been sorted from low to high (3 then 6) and by pointing to REGISTER 2 and REGISTER 1 respectively, reading those registers provides the positions of these two values in list (2 (from REGISTER 2) and 1 (from REGISTER 1), respectively). Assume that other entries in the stack have a null entry so valid entries in the stack can be identified. At this point, we have achieved a low to high sort and maintained list position integrity in the registers.

Now assume the value of the third element in the list is 6. That value matches the value in REGISTER 1, which asserts the match_exist signal line 205 (FIG. 2). REGISTER 2 knows it does not have a match and REGISTER 3 ignores the value 6 because it recognizes that match_exist has been asserted indicating the value already belongs to another register. REGISTER 1 also saves the incremented count value of 3 corresponding to the third element in the count storage 219a. REGISTER 1 now stores two count values, 1 and 3, since the first and third elements of the list were both the same value of 6. REGISTER 1 does not send anything to REG_STACK because REG_STACK has already been informed that matches for the value 6 can be found in REGISTER 1. At this point the process has again achieved a low to high sort by looking at REG_STACK and first finding the value 3 at list position 2 as learned from REGISTER 2. We know that 6 is the next larger value at list position 1 as learned from REGISTER 1, but we also see there is another 6 at list position 3 as also learned from REGISTER 1.

In embodiments, no register stores a value from the list unless the prior register already has a value and no registers currently have matches with that value. Further, each register notifies the REG_STACK only once upon its initial storing of a list element value. Each register can store multiple count values, which each indicate the position in list where the stored value was observed.

To generate the rank ordered list of values, one inspects the REG_STACK, which provides the ranked values, but does not know about positions within LIST or how many matches of each value may have occurred. If list positions are requested by the request computing system 101, the list positions stored in the registers are available. A requesting computing system may also request the sorted list without list positions. If list positions are desired, REG_STACK points to the registers which retain such information and can send all of the list positions to the SENDER 111 (see FIG. 1), which then returns the rank ordered values back to the requesting computer system. SENDER 111 acts as the interface between the rest of the sorter 100 and the requesting computer system 101. The SENDER 111 does not need to accumulate the entire rank ordered list prior to sending, but may instead send them sequentially as they are recovered from the registers.

The approach to rank-ordering the list and handling duplicate values has been described above. However, there needs to be a mechanism to handle outlier situations such as when a large number (or all) of the elements in the list have the same value. If all the elements in the list were the same, REGISTER 1, which handles the first element in the list, would also have to store every count value (indicating every position in list) for every list element. If the list has a large number of duplicate values, then REGISTER 1 would have to store the large number of count values identifying location in the list of the large number of matches. That suggests every register might need storage to store a large number of count values identifying locations in the list of identical values as it is uncertain at what point in the list the large number of matches will occur. Some embodiments may provide a large amount of storage on each register to handle outlier situations and generate an error condition if that storage is exhausted. Other embodiments may provide less storage on each register and generate an error condition if an outlier situation comes up with too many matches.

Figure 4:
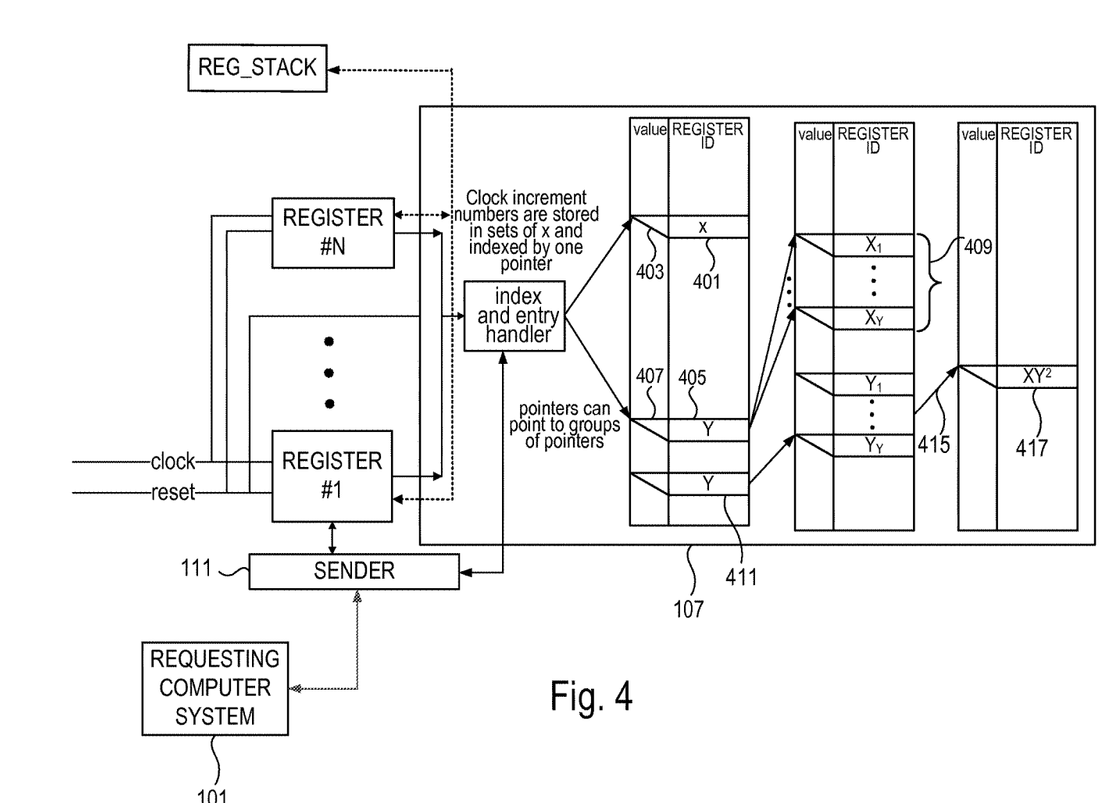
FIG. 4 illustrates additional details of an embodiment of the duplicate stack (DUP_STACK).

In order to provide greater flexibility, an embodiment provides a duplicated values stack (DUP_STACK) 107 to handle overflow matches from the registers. Referring back to FIG. 2, in an embodiment, each register structure includes storage 219 to store a predetermined number X of count values identifying the list position of X occurrences of list element value. Referring to FIG. 4, any occurrences beyond X causes the first X count values to be sent out to DUP_STACK 107, which stores the set of X count values at 401 and returns a pointer 403 to the sending register identifying the location in the DUP_STACK in which the set of X count values are located. The sending register stores the pointer in pointer storage 221 (see FIG. 2) and can store Y such pointers. The count storage 219 is then free to store another set of X count values. There is a tradeoff between operational speed in terms of traversing the pointers to recover the sorted list and the cost of storage on the integrated circuits.

A situation may arise that the size Y of the pointer storage 221 (221a, 221b, 221n) is inadequate to because there are so many matches that the pointer space on a register is exhausted. Accordingly, embodiments provide a mechanism to cascade pointers as needed. Assume, for example, that all Y pointers in pointer storage 221 of a register have been filled and all X count values in count storage 219 have also been filled. The next match triggers sending all X values to DUP_STACK which would return another pointer which cannot be stored on the register, because the pointer storage 221 is full. To address this lack of pointer space, the register will send its batch of pointers to DUP_STACK, but will identify the batch as pointers and not count values. For example, a field may be provided in the communication protocol between a register and DUP_STACK identifying the type of information (pointers or count values) being provided to DUP_STACK by the register. When DUP_STACK stores these pointers, e.g., at 405 they are identified as pointers. Again, DUP_STACK returns a pointer to the sending register which now points to the batch of pointers at location 407 in the DUP_STACK. The pointers 405 point to Y separate sets of X count values 409. That process can be replicated as needed. For example, the Y pointers 411 may point to another Y set of pointers 415, which in turn point to $Y^2$ sets of X count values 417.

Figures 5A, 5B:
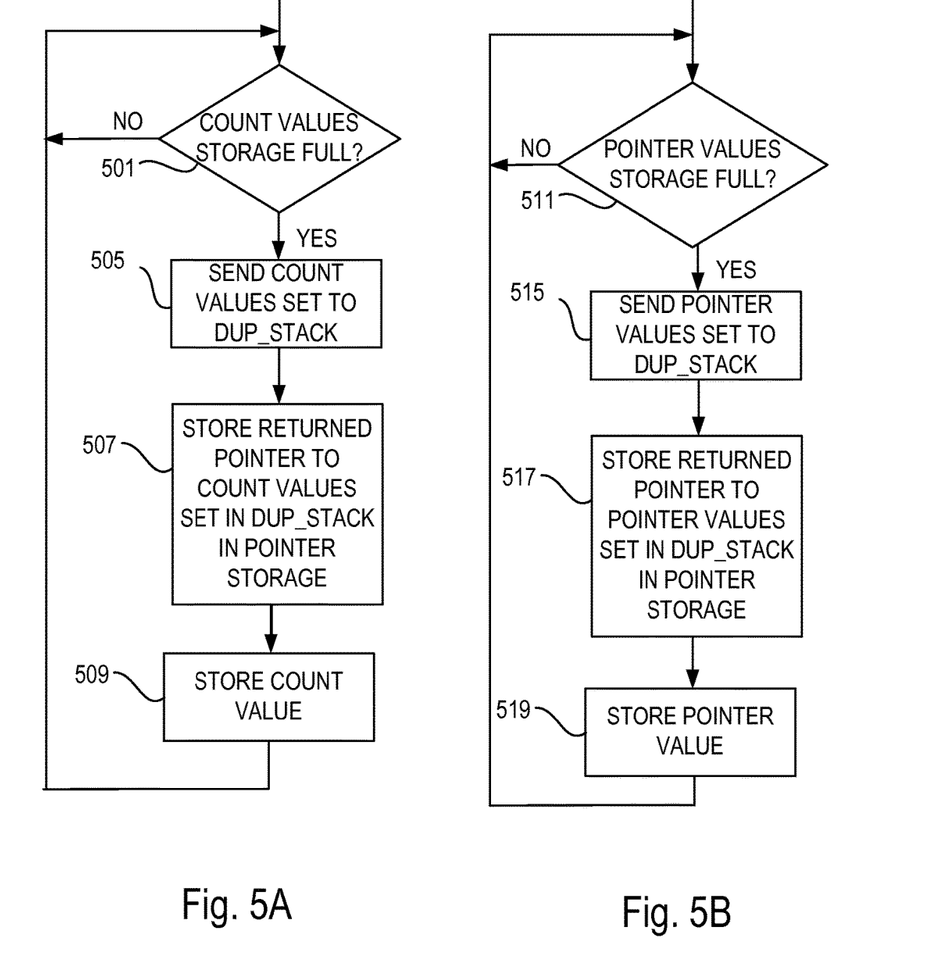
FIG. 5A illustrates an example operational flow of the control logic in a register to utilize DUP_STACK.
FIG. 5B illustrates another example operational flow of the control logic in a register to utilize DUP_STACK.

FIG. 5A illustrates an example operational flow of the control logic 225 (see FIG. 2A) to utilize DUP_STACK. The control logic 225 determines in 501 if the count value storage 219 is full. If not, the control logic waits for the next count value to store. If however, the count value storage is full and unable to store another count value after a match, the register sends the set of count values in the count value storage to the DUP_STACK in 505. In 507, the control logic stores the returned pointer from DUP_STACK in the stored pointers location 221. In that way the count value storage 219 becomes available to store more count values and the count value that was unable to be stored because the count value storage 219 was full in 501 is stored in 509. Note that rather than wait for an overflow condition, a register may send a set of counts to the DUP_STACK when a full condition is detected in the count value storage.

FIG. 5B illustrates an example operation flow of the control logic 225 to utilize DUP_STACK to store pointers in an embodiment. The control logic determines in 511 if the pointer value storage 221 is full. If not, the control logic waits for the next pointer to store value to store. If however, the pointer value storage is full and the register is unable to store another pointer value after the DUP_STACK has returned a pointer value, the register sends the set of pointer values in the pointer value storage to the DUP_STACK in 515. In 517, the control logic stores the returned pointer from DUP_STACK in the stored pointers storage 221. In that way the count value storage becomes available to store more count values and the pointer value that was unable to be stored because the pointer value storage 221 was full in 511 may be stored in 519. Note that rather than wait for an overflow condition, a register may send a set of pointers to the DUP_STACK when a full condition is detected in the pointer storage.

SENDER 111 can be used to send the rank-ordered list back to the requesting computer system. SENDER first looks in REG_STACK for a first value by finding a first entry in the stack that is not a null value. REG_STACK identifies the register number holding that value, e.g., REGISTER N. SENDER then asks REGISTER N for all of its count values and pointer values. For each count value, SENDER can immediately send rank ordered list elements such as value R 34, value R 56, value R 87, value R 109, where value R is the value of the list element stored in REGISTER N and the second number is the count value identifying the location in the list for elements having the value R. Then SENDER uses the pointers to more count values stored in DUP_STACK. DUP_STACK includes a flag indicating whether a particular entry is a count value or a pointer. Sometimes, as described above, a pointer will point to a set of pointers instead of a set of count values. In such cases, SENDER will then query DUP_STACK for the indirectly referenced count values. Such referencing can have arbitrary numbers of layers of pointer-to-pointer referencing prior to getting to the count values. As SENDER receives clock increment numbers from DUP_STACK, it can immediately send rank-ordered list elements having the same value as was stored in the register from which the pointers were retrieved. After each register has directly or indirectly, via pointers, exposed all count values (which are again just position indicators within the original list), then SENDER will re-inspect REG_STACK for the next value which points to a different register and the process is repeated until all registers have been visited and the number of returned, rank-ordered elements equals the number of values originally input from the requesting computer system.

Once the count of returned values equals the count received as part of list, then the sorter could automatically reset. Other embodiments provide that any new request from a computer system be preambled with a reset command. Note that any character set that can be digitally represented can be used with REG_STACK for determining what constitutes the rank ordering. For example, numbers may be chosen to come before letters or vice versa. The REG_STACK can map any values coming from the registers into an indexing order that accomplishes the desired rank-ordering. When the requesting computer system sends a list to the sorter, the type of rank-ordering may be specified and sent to the REG_STACK for subsequent mapping. Embodiments described herein map any language or non-language types.

Consider how embodiments of the sorter handle certain outlier situations. The first situation involves having a huge quantity of only a few values. That would result in only a few registers being populated with values, with a large number of count values and pointers to DUP_STACK. In that case, REG_STACK would also require very few resources. A second scenario is a large number of different valued elements in the list. In that case every different valued element in the lists needs a register and REG_STACK would have to be sized one-to-one with the number of registers. There would be no entries populated into DUP_STACK at all.

One solution to accommodate these two extremes is a modular implementation of hardware where the computer system requesting the sort can "pay as they play." Depending on the type and volume of data being sorted, one would provision an appropriate number of circuit cards (in a rack configuration for example) to meet the needs of the data being sorted. A plurality of registers may be formed on a circuit card. Cards containing registers may be separate from cards containing DUP_STACKS and different from REG_STACK cards. The cards would be scalable. Thus, for register cards, the last register on one register circuit card would electrically connect to the first register on a next circuit card in order to implement the value_exist line between them. The list bus 201 would couple between the circuit cards as would match_exist and communication signal lines with the REG_STACK and DUP_STACK. Even if the values in a list have a very large bit representation, one never needs more registers or REG_STACK space than the number of different values to be processed. However, the width of the "value" storage on each register must be large enough to hold the bit size of the values to be sorted.

Referring again to FIG. 2, the registers 103 includes control functionality 225 that perform the various functions described. The control functionality may be implemented as separate control logic using, e.g., state machines to implement the control functions described herein, including the control flow illustrated in FIGS. 2B, 5A, and 5B. Alternatively, the control functionality may be implemented using a microcontroller or a microprocessor as control logic 225. Such a microcontroller (or microprocessor) may provide control for more than one register. In particular, a processor may control evaluation of the value_exist line, provide the counting function to determine list location, maintain a count location of the current count value, provide appropriate addressing and access to the stored value and the stored pointers, and communicate with the REG_STACK and DUP_STACK as described herein.

The control logic 225 may include memory (not separately illustrated) to store data structures, code instructions, system or device information such as register capabilities such as size of stored values, number of count value locations, number of pointer locations and so on. Various aspects disclosed in the subject specification can also be implemented through (i) program modules stored in a computer-readable storage medium or memory (e.g., forming part of control logic 225 and executed by a processor (forming part of control logic 225) or control for DUP_STACK or REG_STACK, or (ii) other combination(s) of hardware and software, or hardware and firmware.

In the subject specification, terms such as "data store," data storage," "database," "cache," and substantially any other information storage component relevant to operation and functionality of a component, refer to any form of memory that can store information and be read by computers or processors or other electronic components. Memory may be volatile memory or nonvolatile memory, or both. Non-volatile memory can include read only memory (ROM), programmable ROM (PROM), electrically programmable ROM (EPROM), electrically erasable ROM (EEPROM), or flash memory. In addition non-volatile memory can include magnetic and optical memory. Volatile memory can include random access memory (RAM), available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Sender 111 may also utilize a processor and memory to effectuate the functionality described that is associated with sender 111. The Sender may also be used, e.g., to initialize the registers in a power-on reset sequence to assign IDs to the registers.

For large lists, one might send some elements of the list to the sorter so that that the sent elements fit within the hardware-defined limits of the sorting apparatus and then sub-sort using remaining elements. There is a tradeoff that can be managed as a cost. For lower performance, the sorter owner (or leaser) could purchase registers with less "value depth" and tolerate sub-sorting while a maximum performance application may require registers with great "value depth" costing more money. Therefore the sorter architecture lends itself very well to the application, sorting types, volume of values to be sorted, and performance needs of the owner. Alternatively, such sorting can be offered as a service with the cost of the service determined by the various hardware and software components required to implement the service.

Various algorithms used today also provide metrics such as median, mean or mode. Embodiments of the sorting apparatus can provide such metrics. Since the list length is known from the start of processing, to get the median value one approach is to monitor how many times registers send information to the REG_STACK plus how many times the match_exist line toggles. REG_STACK is contacted upon the first occurrence of each value and match_exist toggles on all subsequent observations of an existing value. If the list length is odd, once the summation of REG_STACK and match_exist togglings reaches the mid-point of list length, that value is stored and is the median. If list length is an even number, the two centermost values may be captured and averaged as the median. To find the average, the sum of all incoming values can be generated as they arrive and, upon the last value, divide the total by the list length, which has been provided at the start of the process. Alternatively, a separate counter may count each received list element to determine the list length. To find the mode, in an embodiment DUP_STACK maintains a count of times it is contacted by each REGISTER. The REGISTER with the most contacts to DUP_STACK also holds the mode of the values in LIST. If more than one REGISTER holds the most contacts to DUP_STACK, then we have a multi-mode outcome, which can also be provided by the sorter back to the requesting computer system. Note that the mean, median, and mode functionality 109 can be implemented using, e.g., a processor or microcontroller dedicated to the task. In other embodiments, the processor may be shared, with, e.g., the sender 111.

Thus, aspects of a sorter have been described. The description set forth herein is illustrative, and is not intended to limit the scope of the following claims. Variations and modifications of the embodiments disclosed herein may be made based on the description set forth herein, without departing from the scope and spirit of the following claims.

What is claimed is:

1. A sorting apparatus to sort a list of elements comprising:
 a list communication bus to supply the list of elements;
 a plurality of registers, coupled in parallel to the list communication bus,
 wherein a register of the plurality of registers includes,
  a value storage to store a value of one of the elements in the list;
  an input node to receive an input value exist indication;
  an output node to supply an output value exist indication to indicate, when asserted, that the register is storing a value of an element of the list in the value storage; and
 compare logic responsive to assert a match exist signal line coupled in parallel to the registers if a list value currently being supplied on the list communication bus matches the value in the value storage.

2. The sorting apparatus as recited in claim 1 wherein the input value exist indication is from a previous one of the registers and indicates whether the previous one of the registers has stored a value of one of the elements in the list.

3. The sorting apparatus as recited in claim 1 wherein the register further comprises:
 a list location storage configured to store an indication of a location in the original list to be sorted where the one of the elements in the list appears;
 wherein the list location storage is further configured to store respective indications of additional locations in the original list where list elements appear having a list element value equal to the value of the one of the elements of the list stored in the value storage.

4. The sorting apparatus as recited in claim 3 wherein the list location storage is further configured to store one or more additional list location indications indicative of one or more subsequent locations in the list for items in the list having the value stored in the value storage.

5. The sorting apparatus as recited in claim 1 wherein the register further comprises:
 stored pointer storage configured to store one or more pointers pointing directly or indirectly to another memory location storing list location indications.

6. The sorting apparatus as recited in claim 1 further comprising:
 a register stack communicatively coupled to the plurality of registers wherein the register stack includes a register identification field indexed by the value in the value storage.

7. The sorting apparatus as recited in claim 1 further comprising:
 a duplicate stack communicatively coupled to the plurality of registers and configured to store one or more sets of indications of list locations, each set associated with one of the registers.

8. The sorting apparatus as recited in claim 1 further comprising:
 a duplicate stack communicatively coupled to the plurality of registers, wherein the duplicate stack includes one or more pointers to indications of list locations.

9. The sorting apparatus as recited in claim 1 further comprising:
 logic to determine at least one of mode, median, and mean of the list of elements.

10. A method for sorting a list of elements comprising:
 supplying the list of elements to a list communication bus coupled to a plurality of registers;
 in a register, responsive to the register storing a value of an element of the list in a value storage and a list element being on the list communication bus, checking if a value of the list element matches the value in the value storage and asserting a match exist signal line coupled to the plurality of registers if a match exists and not asserting the match exist signal line if the match does not exist, wherein the register is one of the plurality of registers;
 if the register is not storing a value of a list element in the value storage, responsive to the list element being on the list communication bus,
  checking a value exist input to the register indicating whether a preceding register has stored a list element;
  if the value exist input is not asserted then the register ignoring the list element being on the list communication bus;
  if the value exist input is asserted then the register ignoring presence of the list element if the match exist line is asserted by another one of the plurality of registers; and
  if the value exist input is asserted and the match exist line is not asserted, the register storing a value of the list element in the value storage associated with the register.

11. The method as recited in claim 10 further comprising the register storing an original list location associated with the list element stored in the value storage.

12. The method as recited in claim 10 further comprising:
 storing original list location information associated with the list element stored in the value storage;
 storing additional original list location information associated with a matching element in the list supplied on the list communication bus.

13. The method as recited in claim 10 further comprising:
 storing one or more pointers pointing directly or indirectly to another memory location storing a set of list location indications.

14. The method as recited in claim 10 further comprising:
 storing in a register stack a register identification field indexed by the value in the value storage.

15. The method as recited in claim 14 further comprising:
 the register sending information to the register stack of the value stored in the value storage and an identification of the register.

16. The method as recited in claim 10 further comprising:
 storing one or more sets of indications of list locations in a duplicate stack communicatively coupled to the plurality of registers, each set associated with one of the registers.

17. The method as recited in claim 10 further comprising:
 storing one or more pointers to indications of list locations in a duplicate stack communicatively coupled to the plurality of registers.

18. The method as recited in claim 10 further comprising:
 determining at least one of mode, median, and mean of the elements of the list.

19. A sorting apparatus to sort a list of elements comprising:
 a plurality of registers, wherein one of the registers includes,
  value storage to store a value of one of the elements of the list;
  an input node to receive an input value exist indication from a previous one of the registers indicating whether the previous one of the registers is storing another value of another one of the elements of the list;
  an output node to supply an output value exist indication to a next register of the plurality of registers to indicate whether the one of the registers is storing the value of the one of the elements in the list in the value storage; and
  a counter to count responsive to every element of the list; and
  count storage to store a count value of the counter that corresponds to an original list location of the one of the elements in the list whose value is stored in the value storage.

20. The sorting apparatus as recited in claim 19 further comprising:
 a register stack communicatively coupled to the registers to store an indication of a register of the plurality of registers storing a value of a list element indexed by the value; and
 a duplicate stack coupled to the plurality of registers to store overflow of count values.

* * * * *